April 15, 1969   G. M. BERGSTRAND ET AL   3,439,199
MAGNETOSTRICTIVE UNIT
Filed May 23, 1966

Gunnar Magnus Bergstrand
and Per-Arne Tove INVENTORS

BY Wenderoth, Lind & Ponack
ATTORNEYS 3,439,199
MAGNETOSTRICTIVE UNIT
Gunnar M. Bergstrand, Gokvagen 75, Nasbypark, Sweden, and Per-Arne Tove, Ringvagen 36, Uppsala, Sweden
Filed May 23, 1966, Ser. No. 552,263
Claims priority, application Sweden, May 26, 1965, 6,930/65
Int. Cl. H02h 11/00
U.S. Cl. 310—26                            3 Claims

ABSTRACT OF THE DISCLOSURE

A mangetostrictive unit to perform a limited force transmitting stroke when subjected to the influence of a magnetic field. A plurality of magnetostrictive rods possessing opposite magnetostrictive characteristics are arranged parallel to each other side by side in at least one row in such a way that two adjacent rods have opposite characteristics. Every other rod in each row has a hook at each end and the hooks project in different transverse directions to engage the end surfaces of adjacent rods, whereby the rods form a continuous chain transmitting forces in the longitudinal direction of the rods. The free end of the first rod in each row rests on a stationary support, while the free end of the last rod in each row acts upon a movable member.

---

Figure 1:
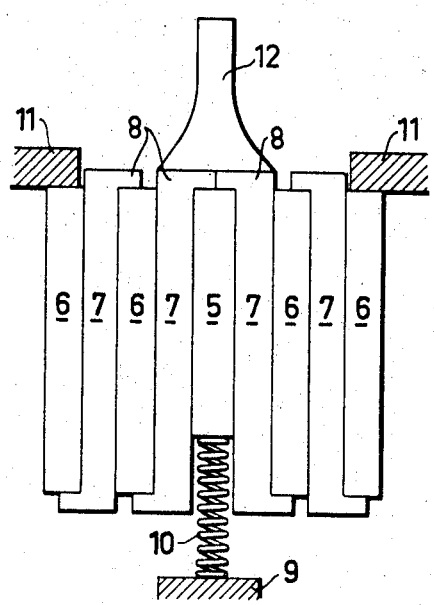

The invention relates to a magnetostrictive unit of the kind adapted to perform a limited force transmitting stroke when subjected to the influence of a magnetic field.

The magnetostrictive character may be of positive or negative sign and, as known, it appears substantially in connection with certain metals and metal oxides. In all cases the magnetostriction causes only very small changes of length per unit of length of the elements used, but an enlarged movement can be obtained within a moderate space if elements showing positive magnetostriction and elements showing negative magnetostriction are connected alternately into a chain in such a way that expansions and contractions together generate a total movement in the same direction.

Owing to the very small changes of length it must, of course be of interest to use the most effective magnetostrictive materials. Especially certain metal ferrites, such as colablt-ferrite, show relatively high magnetostriction values and, as an example, thorough measurements have provied that a magnetic field may shorten the length of a rod of cobalt-ferrite by more than $10^{-2}$ percent. This value is considerably higher than those to be found in the literature. However, rods produced of sintered oxide powders are rather brittle when subjected to bending or tensile stresses, even if their resistance to high pressure is very good and, further, sintered masses are difficult to secure to other materials, such as metals.

The object of the invention is to provide a magnetostrictive unit able to generate and transmit rather great forces as well as to perform a relatively great rectilinear movement or stroke. Another object is to make possible the use of highly magnetostrictive sintered masses in a chain of magnetostrictive elements, although the invention is in no way limited to such a use. According to the invention, a plurality of magnetostrictive rods of positive and negative signs are arranged in parallel to each other side by side in at least one row in such a way that two adjacent rods have different signs. The ends of adjacent rods are designed to engage each other alternately, i.e. in zig-zag, by means of loose connections so that the rods form a continuous chain able to transmit forces in the longitudinal direction of the rods. Further, the free end of the first rod in the row rests on a stationary support, while the free end of the last rod in the row is adapted to act upon a movable member.

Preferably every second rod has a hook at each end, and the two hooks must then project in opposite transverse directions to engage the end surfaces of adjacent smooth rods. In such case the hooks are provided on the rods having the greatest tensile strength, i.e. generally metal rods with good positive magnetostriction. The rods resting against the hooks need only transmit compressive forces and the bending stress may be practically wholly avoided by placing the rods so closely that they support each other laterally. As described below, rows of loosely connected rods may be arranged as a bundle whereby the unit is given a very compact structure. Another advantage is that the construction becomes cheap because the simply shaped rods can be manufactured at low costs and then easily combined to units of desired size.

The solenoid or solenoids producing the magnetic field may be supplied with direct or alternate current. A direct current operated device produces a movement of fixed magnitude and is useful for controlling valves of a certain kind, for instance. When alternate current is used, the movement transmitting member is caused to oscillate in step with the periodicity of said current, and such a device is well suited for stamping or embossing of various materials, such as sheet metal, for instance, because an oscillation actually facilitates the operation.

According to a further development of the inventive idea, it is possible in an alternate current operated device to increase the length of stroke considerably (more than 10 times) if the whole mass of the device is caused to oscillate in resonance with the periodicity of the alternate current. Such a resonance oscillation, which may in the known way be amplified by a resilient mounting, is obtainable either by adapting the natural frequency of the mass to the periodicity or by adapting the periodicity to the natural frequency. In the latter case, it is possible to use a transistor oscillator, the frequency of which is adapted to that of the mechanical system either by suitably selected components or by means of a magnetic coupling from the oscillating system. The pulsating movement increased in any of these manners may be damped by damping means known per se (mechanical or hydraulic filters) so that only the mean value of the movement is transmitted and the system will thus yield an increased length of stroke without noticeable oscillation.

Among the magnetostrictive materials at disposal it is preferable to select those having the highest coefficient of magnetostriction. As an example there may be mentioned an iron-cobalt alloy (30% Fe, 70% Co) having the coefficient $+130 \times 10^{-6}$ (i.e. positive change of length) and cobalt ferrite ($CoF_2O_4$) having the coefficient $-110 \times 10^{-6}$ (negative change of length).

Figure 2:
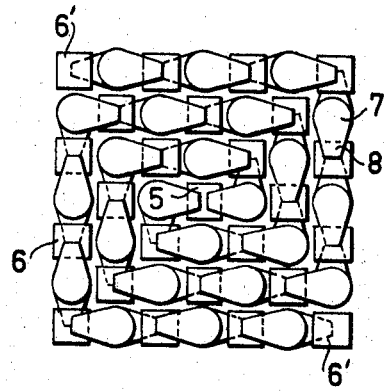
Figure 3:
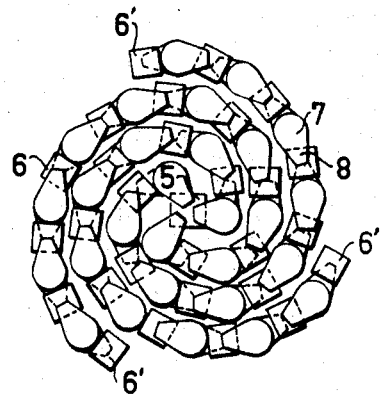
Figure 4:
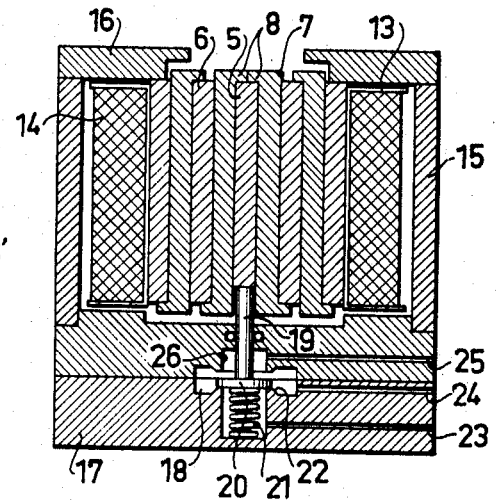
Figure 5:
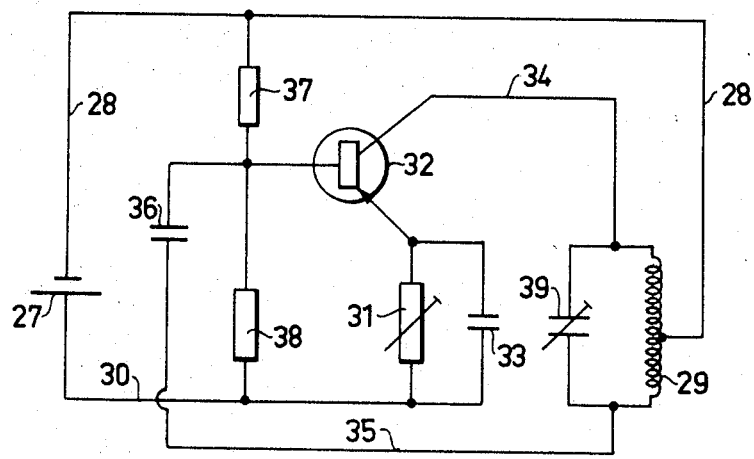

The invention will be described in more detail with reference to the accompanying drawings, in which FIG. 1 diagrammatically shows a side view of a simple embodiment, the only purpose of which is to illustrate the principle of the invention. FIGURES 2 and 3 show end views of two other embodiments of rod bundles. FIGURE 4 shows an axial section through a magnetostrictive device used for controlling a valve. FIGURE 5 shows a circuit diagram for a transistor oscillator useful together with the magnetostrictive device.

As seen in FIG. 1, the device is composed of smooth rods 5, 6 and approximately Z-shaped rods 7, i.e. the ends of the rods 7 are provided with hooks 8 projecting in opposite directions. The upper hooks 8 of two inner rods 7 are turned towards each other and engage one end of a smooth central rod 5, and the opposite end of the central rod 5 is acted upon by a compression spring 10 resting on a stationary support 9. The hooks 8 at the lower ends of the inner rods 7 engage the ends of straight rods 6 disposed to the outside thereof, and this alternation may be repeated a desired number of times. Care should only be taken that both chains of rods become identically equal. The chains of rods are terminated by two smooth outer rods 6 which are held against stationary wall parts 11 by the action of the spring 10.

The rods are disposed closely to each other so as to support each other laterally, and the bundle may be held together by a surrounding sleeve, not shown. Such a sleeve may support a solenoid, likewise not shown, which generates a magnetic field. As known in the art, every second rod has negative magnetostriction and every second rod has positive magnetostriction with the exception that the central rod 5 may be of some neutral material, as its only purpose is to serve as a supporting member. As explained above, the smooth rods 6 may conveniently be made of sintered goods with negative magnetostriction (ferrite), while the hooked rods 7 are of a metal with positive magnetostriction.

The upper ends of the two inner Z-rods 7 carry an upwardly directed conical body 12 which serves as movement transmitting member. When the rod bundle is influenced by the magnetic field of a surrounding solenoid, the body 12 will obviously be moved upwards in FIG. 1, because every second rod 6 becomes slightly shorter, while the intermediate rods 7 become slightly longer. On supply of alternate current to the solenoid the rod bundle is subjected to an oscillating movement corresponding to the periodicity of the alternate current. The cone 12 has then the function (known per se) to serve as a mechanical transformer, i.e. the cross sectional area of the body 12 diminishes exponentially, and in this way the movement may be increased up to about 10 times. As known in the art, such an oscillating movement may be damped by known means so that a considerably increased length of stroke is obtained as an average value.

It is true that the relative movement between two adjacent rods is rather small under any circumstances but if the friction between the rods should nevertheless be inconvenient, all the rods or some of the rods may be provided with a friction reducing coating in the form of a thin film of Teflon, for instance.

FIGS. 2 and 3 show two different embodiments of rod bundles more suitable for practical purposes. In both cases, chains of rods are built up in the same way as in FIG. 1 starting from a central supporting member 5, but here the rows of rods form helical coils around the centre so that the bundle gets a square cross section (FIG. 2) or a rounded cross section, as shown in FIG. 3, for instance. In both figures, the smooth sintered rods 6 have square cross section, while the metal rods 7 with hooks 8 are round. The bundle in FIG. 2 is composed of two rows of rods each containing twelve round rods 7 and twelve square rods 6, and the rows are terminated by two outer square rods 6' adapted to rest against fixed supports in the same way as in FIG. 1. In FIG. 3, there are three helical rows of rods, whereby the bundle is given three symmetrically situated supports 6' and thus will be better balanced. For better clarity, the rows of rods in FIGS. 2 and 3 have been shown with some clearance, although also here the rods are intended to be arranged closely enough to support each other laterally. To render possible the helical shape of the chains of rods it is obviously necessary that the hooks 8 of at least some of the rods 7 form an angle of less than 180° to each other in the cross section of the bundle. In some cases an angle of 90° may be required, as apparent from FIGS. 2 and 3.

In FIG. 4, the bundle of rods is, for the sake of simplicity, shown in the same design as in FIG. 1, although a more compact bundle of the kind shown in FIG. 2 or FIG. 3, for instance, may be to prefer in practice. The bundle of rods is surrounded by an insulating sleeve 13 which carries a solenoid 14 intended to be fed by direct current or alternate current, and the solenoid is in turn surrounded by a jacket 15 of soft iron. The jacket 15 has an annular end wall 16 which supports the ends of the outer rods of the rod chains. The opposite end of the jacket 15 is fixed to a block 17 which is composed of two parts together forming a central valve housing 18. The central supporting member 5 of the rod bundle rests on the end of a piston rod 19 protruding from a valve disk 20 within the housing 18 and said disk 20 is acted upon by a compression spring 21 mounted in the valve housing. The arrangement is thus similar to the embodiment shown in FIG. 1, in that the bundle of rods 5, 6, 7 is held between the end wall 16 and the outer end of the piston rod 19. In the initial position shown, the rod bundle keeps the valve member 20 against an annular valve seat 22 to close the communication with a channel 23 for supply of pressure fluid. In this position of the disk 20 an outlet 25 is in communication with a channel 24 intended to be connected to an operating cylinder or the like. When current is supplied to the solenoid 14, the bundle of rods permits the disk 20 to move upwards into sealing engagement with an annular seat 26 disposed above, so that the outlet 25 is closed and the communication between the pressure fluid channel 23 and the channel 24 is opened. The valve means shown is only to be regarded as an example, as valves of course may be designed in several other ways.

The magnetostrictive device described may be combined with various means for increasing the length of stroke and/or means for damping an oscillating movement caused by alternate current, and suitable means therefore will be described with reference to FIG. 5.

The transistor oscillator shown in FIG. 5 is of a structural design basically known and is useful for adapting the periodicity of the alternate current to the natural frequency of the apparatus. One pole of a battery 27 or some other source of direct current is connected by a conductor 28 to a central tap of the solenoid 29 producing the required magnetic field. A conductor 30 containing a variable resistance 31 connects the other pole of the battery 27 with the emitter electrode of a transistor 32. A condenser 33 is connected in parallel to the rheostat 31. A conductor 34 connects the collector electrode of the transistor 32 with one end of the solenoid 29, the other end of which is connected to the base electrode of the transistor by means of a conductor 35 containing a condenser 36. A resistance 37 is connected between the conductor 28 and a point between the condenser 36 and the base electrode, while another resistance 38 is connected between said point and the conductor 30 from the other pole of the battery. Further, the two conductors 34, 35 are interconnected by a tuning condenser 39 connected in parallel to the terminal of the solenoid, and thereby it is possible to adjust the frequency of the current in dependence on the natural frequency of the mechanical system. The rheostat 31 renders possible an adjustment of the amplitude which may be desired when operating throttle valves, for instance. The battery 27 indicated in FIG. 5 may very well be replaced by a source of alternate current and a rectifier assembly.

What we claim is:

1. A magnetostrictive unit adapted to perform a limited force transmitting stroke when subjected to the influence of a magnetic field, comprising a plurality of magnetostrictive rods possessing opposite magnetostrictive characteristics arranged parallel to each other side by side in at least one row in such a way that two adjacent rods have opposite characteristics, every other rod in each row having a hook at each end, said hooks projecting in different transverse directions to engage the end surfaces of adjacent rods, whereby the rods form a continuous chain transmitting forces in the longitudinal direction of the rods, the free end of the first rod in each row resting on a stationary support, while the free end of the last rod in each row acts upon a movable member.

2. A magnetostrictive unit as claimed in claim 1, in which at least two force transmitting chains of rods extend from spaced supports to an intermediate central member adapted to be moved.

3. A magnetostrictive unit as claimed in claim 2, in which the chains of rods are wound helically around the central movable member.

References Cited

UNITED STATES PATENTS

| 1,467,318 | 9/1923 | Herdman | 318—118 XR |
| 2,317,166 | 4/1943 | Abrams. | |
| 2,476,778 | 7/1949 | Smoluchowski | 310—26 |
| 3,349,304 | 10/1967 | Wachter | 318—118 |

MILTON O. HIRSHFIELD, *Primary Examiner.*

D. F. DUGGAN, *Assistant Examiner.*

U.S. Cl. X.R.

318—118